Oct. 13, 1964   J. R. MORRISON   3,152,633
HOUSEHOLD HEATING FURNACE WITH COMBUSTION
PRODUCTS RECIRCULATION
Filed July 24, 1962   3 Sheets-Sheet 1

INVENTOR.
John R. Morrison,
BY
John H. Bradford,
his ATTORNEY.

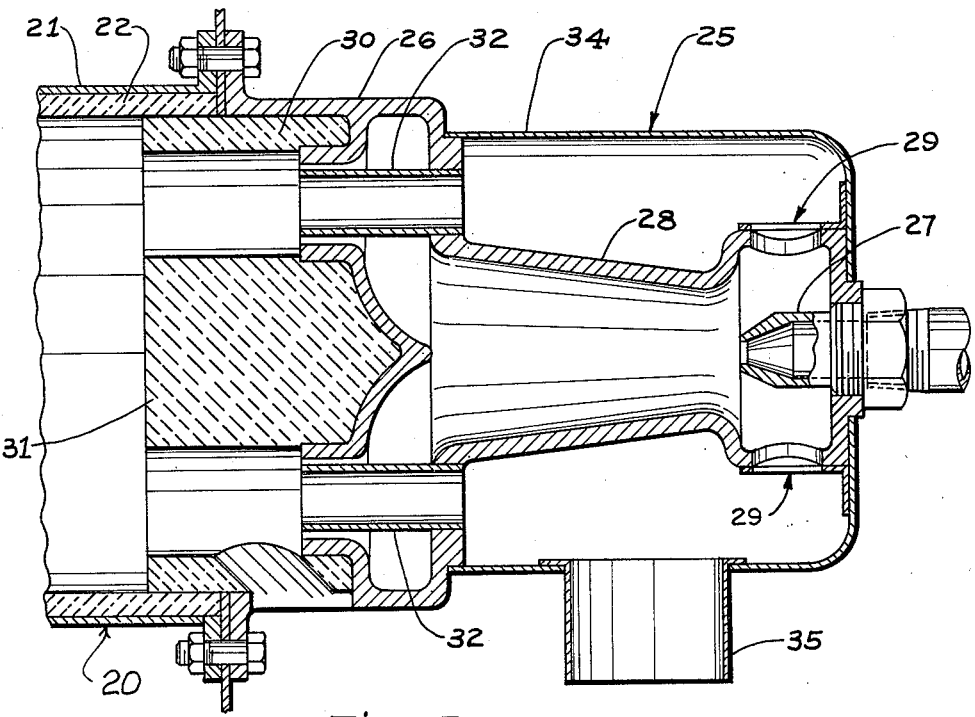
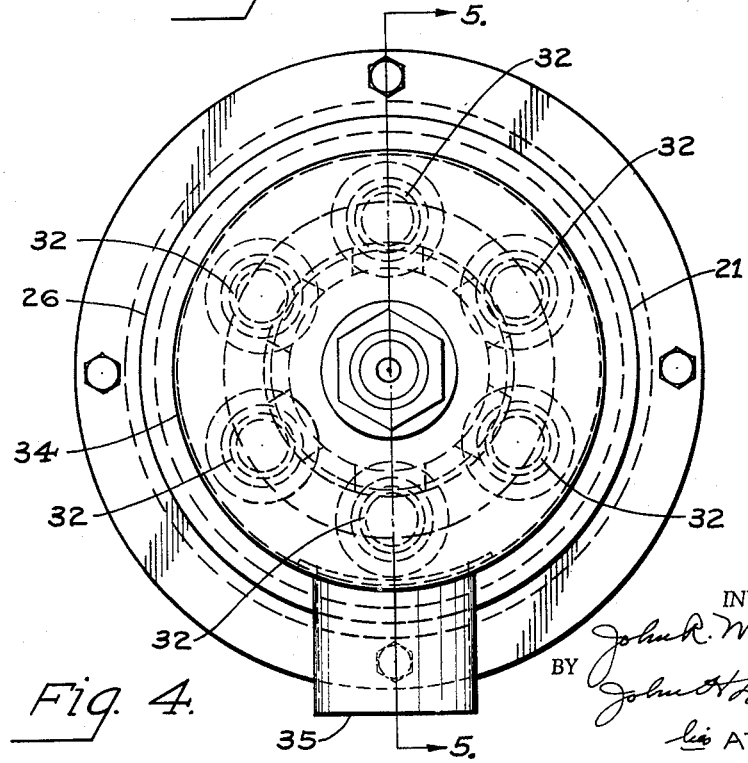
Fig. 5.
Fig. 4.

ns patentsnot# United States Patent Office 3,152,633
Patented Oct. 13, 1964

3,152,633
HOUSEHOLD HEATING FURNACE WITH COMBUSTION PRODUCTS RECIRCULATION
John R. Morrison, Shaker Heights, Ohio, assignor to Herbster-Schmieler, Inc., Cleveland, Ohio, a corporation of Ohio
Filed July 24, 1962, Ser. No. 212,074
2 Claims. (Cl. 158—1)

This invention relates to household heating furnaces, and particularly to household heating furnaces wherein forced recirculation of the products of combustion is maintained within the heat exchanger of the furnace during operation of the furnace.

Conventional domestic hot air furnaces employing blowers for circulating the air to the various rooms are subject to considerable stack losses under both operating and standby conditions. This is because these furnaces employ natural stack drafts for venting the interior of the heat exchanger. The tendency of a natural stack draft is to exhaust the hot products during furnace operation and before the heat has been extracted by the exchanger. Also it draws cooling air into and through the exchanger while the furnace is in standby condition, and thereby withdrawing heat from the walls of the exchanger from the inside and discharging the air thus heated through the stack.

In accordance with the present invention, a furnace is provided in which the products of combustion within the furnace heat exchanger are continuously recirculated during operation of the furnace, a controlled fraction only of the recirculating products being bled off and discharged through a stack, thus retaining the products until more of the heat is extracted. In standby condition, the exchanger is air-locked to a degree which prevents or greatly reduces the flow of outside air into and through the heat exchanger.

The internal recirculating system for the products of combustion provides uniform distribution of the heated products throughout the exchanger so that the heat exchange is uniform throughout the exchanger, and therefore the house can be heated more uniformly and with a smaller exchanger since all of the area of the exchanger is effective for heat transfer. Further, the furnace assures combustion of any gaseous fuel before its escape from the exchanger, including the re-ignition of the fuel where necessary. Likewise, the furnace is such that, during standby conditions, the interior of the exchanger is air-locked to a substantial degree so as to prevent appreciable circulation of cooling air through the exchanger and loss of heat therewith through the stack. The recirculation provided reduces soot and eliminates deposits thereof within the exchanger. It also reduces back pressure on the burner while at the same time assuring proper discharge from the stack or flue of the spent products of combustion bled off during operation of the furnace so that the stack does not become choked by extraneous down drafts or accumulation therein of cooled products of combustion.

The furnace will operate effectively in upright, prone, or in any position selected, and thus can be accommodated in spaces that are not otherwise suitable for conventional household furnaces.

Various other objects and advantages of the invention will become apparent from the following description wherein reference is made to the drawings, in which:

FIG. 4 is an enlarged rear elevation of the burner which may be used in connection with the present invention; and FIG. 5 is a cross sectional view taken on the line 5—5 in FIG. 4.

Figure 2:
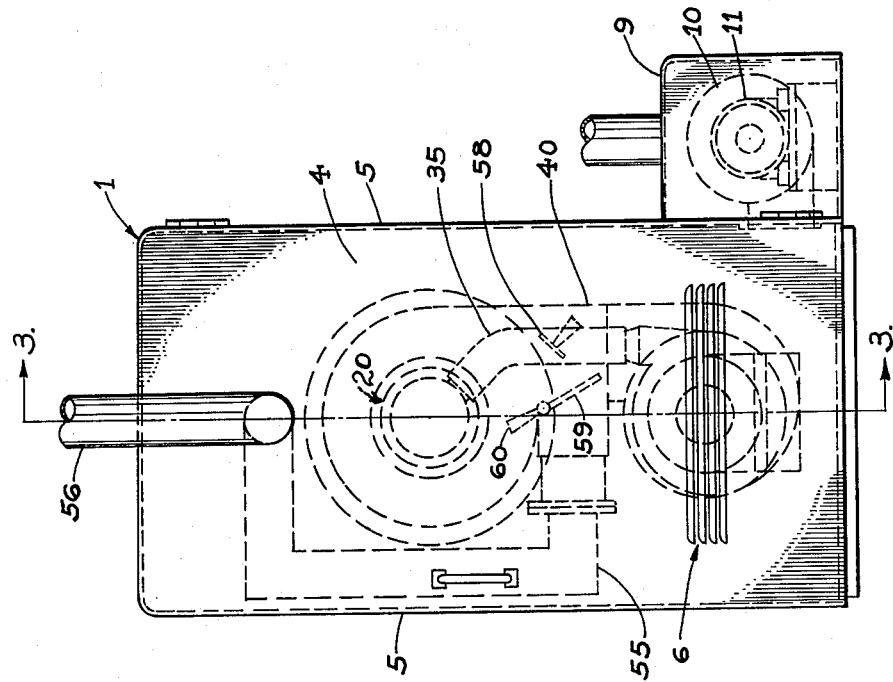
FIG. 2 is a rear elevation of the furnace shown in FIG. 1.
Figure 1:
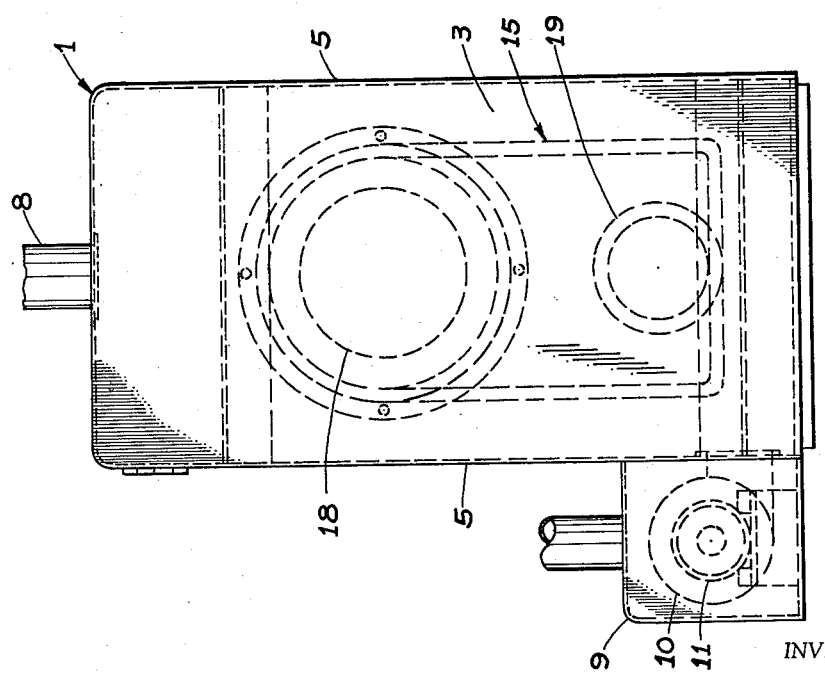
FIG. 1 is a front elevation of a furnace embodying the principles of the present invention.
Figure 3:
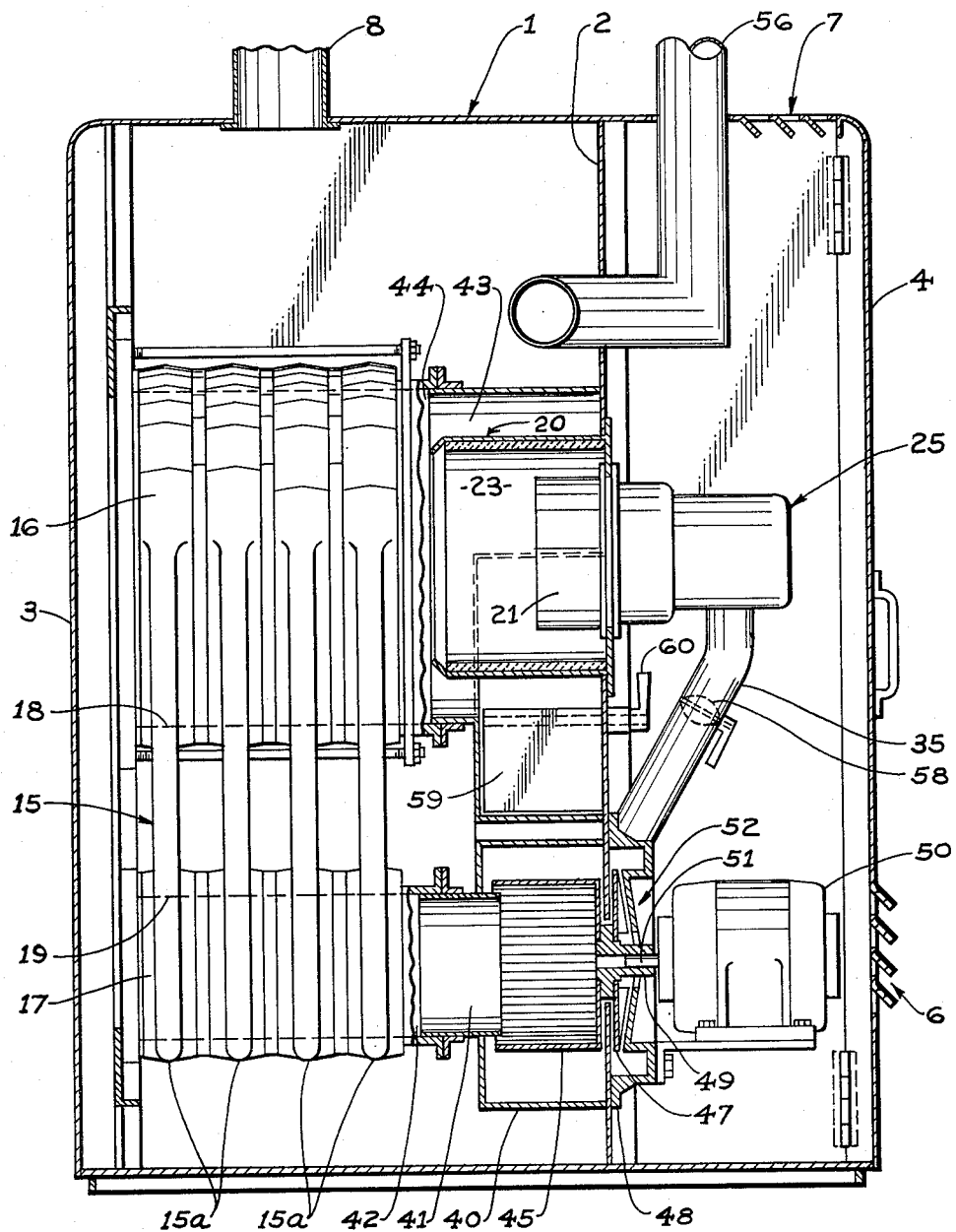
FIG. 3 is a vertical sectional view of the furnace taken on the line 3—3 in FIG. 2.

Referring to the drawings, the furnace, indicated generally at 1, is shown for purposes of illustration in upright position. The furnace comprises an upright casing 2 having a front wall 3, a rear wall 4, and conventional side walls 5. The rear wall 4 has openings 6 and 7 to permit the ingress of air into the rear of the cabinet so that it can be supplied by the burner blower to the burner for sustaining combustion. At its top, the cabinet has an outlet opening 8 for the hot air to be introduced into a duct system for circulation into the various rooms to be heated. On one side of the cabinet is a suitable extension 9 in which is arranged an air circulating blower 10 driven by a conventional motor 11 for receiving air from a return duct or from the room in which the furnace is located and for recirculating it through the cabinet where it sweeps the entire heat exchange head of the furnace from bottom to top and discharges through the outlet 8.

Mounted within the cabinet is a hollow heat exchanger 15 which is preferably composed of a plurality of duplicate hollow sections 15a arranged in a row which extends forwardly and rearwardly of the cabinet. The sections 15a have upper widened annular end portions 16 and lower widened annular end portions 17 which engage each other when the sections are assembled. The inner peripheries of the annular portions of each section are open into the interiors of the associated sections so that, when the sections are assembled, a continuous inlet passage 18 extending lengthwise of the row is provided at the top, and a continuous discharge passage 19 parallel thereto is provided at the bottom. The portions of the sections 15a between the portions 16 and lower portions 17 are spaced apart from each other so that air can circulate readily therebetween. The forward faces of the annular portions of the forward sections 15a are closed by welding suitable plates thereon. The rear faces of the annular portions of the rear sections 15a are left open for connection to suitable recirculating ducts for the products of combustion.

Thus the hollow exchanger is arranged to receive burning fuel and products of combustion endwise of, and at the upper rear of, the passage 18 and direct the products downwardly through the head mid-portions of the sections 15a to the passage 19, and discharge the products from the lower rear of the passage 19.

For supplying products of combustion and recirculating them through the exchanger, a combustion device 20 is provided. The device is hollow and arranged in coaxial relation to the open end of the passage 18. It is somewhat smaller in diameter than the passage 18.

In the form illustrated, the device comprises a cylindrical shell 21 lined with ceramic material, as indicated at 22, and a coaxial combustion chamber 23 of larger diameter than the shell 21. The combustion chamber is preferably a refractory lined shell coaxial with the passage 18 and has its discharge end opening into the rear end of the passage 18.

For supplying heat, a burner 25 is provided. The burner preferably comprises a shell 26 which may be bolted to the open end of the combustion chamber 23 opposite from the exchanger. The burner may include a suitable gas or hydrocarbon discharge nozzle 27 discharging into a mixing bell 28 which expands in the direction toward its discharge end of chamber 23. Air is supplied to the mixing valve through ports 29 for an initial mixture with the fuel. The fuel is discharged from the large end of the bell into a ceramic annular shell 30. In coaxial relation with the shell 30 is an inner heated ceramic spreader 31 which, with the shell 30, defines an annular passage for the gas and fuel mixture.

In addition to the air supplied in the bell, secondary air for combustion is supplied into the shell. For this purpose, a plurality of tubes 32, open at both ends, are provided. Each tube 32 extends from a location outside of the bell 28 into the annular space between the spreader 31 and the ceramic lining 22 in spaced relation to both. Forced air is supplied to the burner and through the tubes 32. For this purpose, a suitable air housing 34 surrounds the bell in radially spaced relation and is adapted to receive forced air from an air duct 35. Thus a thorough mixture of fuel with primary air from the ports 29 is provided, and secondary air is supplied through the tubes 32.

In order to recirculate the products of combustion, a recirculating duct 40 is provided at the rear of the heat exchange head. This duct has an inlet 41 connected to the outlet 42 of the passage 19 of the heat exchanger. The duct 40 has an outlet 43 connected to the inlet 44 of the passage 18 of the heat exchanger. The upper portion of the duct 40 is in surrounding spaced relation to the chamber 23 so that recirculated products forced upwardly through the duct enter the upper portion of the duct in tangential relation to the chamber 23 and pass in surrounding relation to the chamber and then flow, as a swirling stream, while moving endwise of the chamber toward its outlet end and past its outlet end into the inlet 44 of the passage 18 of the exchanger.

The outlet 43 is substantially the same diameter as the inlet 44. The chamber 23 is of less diameter than the inlet 44 and is coaxial therewith so that the annular swirling stream from the outlet portion 43 of the duct 40 surrounds the stream of burning products issuing from the outlet end of the chamber 23 and both streams enter the inlet 44 freely.

Arranged in the lower portion of the duct 40 is a blower 45 which receives products from the outlet 42 of the head and discharges them upwardly through the duct 40. Also, adjacent the bottom of the duct is an air blower 47 arranged to supply air under pressure through the duct 35 to the burner. The blower 47 preferably is a radial discharge type enclosed in the housing 48 coaxial with the blower 45. The blowers 45 and 47 are coaxial and preferably are mounted on a common hub 49 in coaxial relation with each other for co-rotation about the common axis.

For driving the blowers, an electric motor 50 is provided. The motor has a shaft 51 which is received in, and supports, the hub 49. The housing 48 has an inlet 52 which surrounds the hub so as to define between the periphery of the inlet 52 and the hub a narrow annular air inlet passage. All of the air drawn in by the blower 47 and fed to the duct 35 must pass over and cool the hub and thereby protect the hub and the shaft of the motor from overheating.

It is to be noted that the recirculated products are discharged from the blower 45 under relatively high pressure, but they are discharging into a heat exchanger in which pressure is reduced due to its outlet being connected to the inlet of the blower 45. Accordingly, the recirculated gases pass rapidly up through the duct around the exterior of the combustion chamber 23 and then forwardly in an annular stream past the discharge end of the chamber. This causes a Venturi effect which reduces the pressure and tends toward a sub-atmospheric pressure at the outlet of the combustion chamber 23 and hence at the outlet of the shell 21. This effect assists in reducing back pressures as the result of the combustion and expansion of the fuel and air mixture furnished in the combustion chamber 23 and the secondary air supplied therein around the burner.

Since additional air and fuel are continuously being introduced into the heat exchanger during the operation of the furnace, means must be provided to bleed away the excess which would otherwise accumulate. For this purpose, a bleeder duct 55 is connected at its inlet end to the duct 40 and at its outlet end to an external stack duct 56 which leads to the conventional house stack as desired. If desired, the duct 56 can be arranged to discharge through the side wall of the house, as the bled off products are discharged under super-atmospheric pressure.

Since there is a different volume of products of combustion, depending upon the fuel used, the size of the tubes 32, and the size of the fan or blower 47, a regulating damper 58 may be provided in the duct 35 to control the volume of products admitted. It is necessary for effective recirculation also to balance the amount of recirculating products entering the inlet of the bleeder duct 55 with that admitted by the burner. For controlling the entry of the recirculating products into the bleeder duct 55, a damper 59 operated by an exterior handle 60 is provided. By shifting the dampers 58 and 59, a fraction of the products being supplied can be bled away through the duct 55 into the atmosphere so as to provide a balance in input and output of gases.

With the arrangement thus provided, suction on the stack is unnecessary. Hence there is much less tendency for bleeding away heat from the head by passage of outside air through the interior thereof during standby of the furnace.

The efficiency of the structure is enhanced due to the fact that forced air is used in the burner. The entire exchanger is swept internally by the hot recirculating gases and hence heats more uniformly so that all of its surface is effective to supply heat into the external air for a head of a given size. Air is provided by the blower 10 at the lower portion of the exchanger so that the air can sweep the entire exchanger, thus utilizing the heat exchange function most effectively. The Venturi effect of the recirculating gases assists the burner in effective discharge and prevents building up of back pressure. Due to the recirculation of products, stratification of the heated products in the upper portion of the exchanger is eliminated and the entire exchanger becomes effective for heating the air. The amount of gases discharged into the atmosphere may be controlled. The back pressures on flues and the like which occur in some household installations are not objectionable, as the discharge of the gas products from the furnace is by virtue of a forced flow and super-atmospheric pressure within the exchanger. The inlet of the bypass duct 55 is below the burner box and preferably below the level of a major portion of the heat exchanger, as a result of which, when the furnace is in standby condition, the loss of heat by its bleeding away through a stack or vent is eliminated. Since the furnace depends on the internal super-atmospheric pressure for the discharge of excess products of combustion, the furnace can be operated in any position and hence can be placed in spaces in a room which would otherwise be inadequate for a furnace.

*Operation*

Thus, in operation, fuel is fed through the nozzle 27 into the bell 28 wherein it is mixed with primary air entering through the ducts 29 into the bell. This mixture is discharged into the combustion chamber 23 and secondary air is introduced thereinto at spaced portions circumferentially of the flame through the tubes 32. The burning fuel and air mixture is discharged into the combustion chamber directly endwise of the passage 18, the flow being enhanced by the Venturi effect of the recirculated gases and products passing around the exterior of the combustion chamber 23. The products of combustion pass downwardly through the sections 15a of the exchanger 15 and are drawn out at the bottom through the bottom passage 19 into the duct 42. Then they are recirculated, controlled amounts being bled off through the bleeder duct 55, the amounts bled off controlled by the dampers 58 and 59.

Regulation of the secondary air can be effected depending upon the particular type of fuel and results desired by means of a suitable damper, such as at 58, arranged in the secondary air duct 35, and discharged through the nozzle 27. The fuel is regulated in a conventional manner, depending upon the type of supply means available. The blower 10 causes the air which is to be circulated through the room to sweep the entire heat exchanger, and likewise the exterior of the duct 40, so that little loss of heat to the outside occurs and overheating of the parts is eliminated. With the furnace in standby condition, there is little loss of heat by flow of air through the exchanger from the bottom upwardly and through the stack, due to convection currents.

Having thus described my invention, I claim:

1. A furnace comprising an upright hollow heat exchanger having an outlet at its lower end and having a front wall and a rear wall, said rear wall having near the top of the exchanger an inlet for products of combustion, a recirculating duct having a generally upright portion for the products of combustion at the rear of the exchanger and having a forwardly extending duct inlet portion connected to said outlet of the exchanger and a forwardly extending duct outlet portion directed into the inlet of the exchanger, and substantially coextensive and coaxial therewith, a combustion chamber in the outlet portion of said duct and extending endwise forwardly thereof from the rear thereof toward the exchanger and having a discharge opening at its forward end aligned with, directed into, and of smaller cross section than, the heat exchanger inlet, said combustion chamber having a peripheral outer side wall in radially inwardly spaced relation to the side wall of the duct outlet portion and defining therewith an annular passage for the products of combustion between the exterior of the peripheral wall of the combustion chamber and the side wall of the duct outlet portion, and directed into the exchanger inlet so that the products of combustion being recirculated pass as an annular stream into the exchanger inlet and create a low pressure area surrounding the discharge opening of the combustion chamber, burner means for supplying combustible hydrocarbon fuel into said combustion chamber, a power driven recirculating blower in the recirculating duct, said blower having its inlet connected with the duct inlet and its outlet discharging upwardly in the upright portion of the duct for recirculating products of combustion from the exchanger by drawing the products from the outlet of the heat exchanger and blowing them through the duct and out through the duct outlet portion so that they pass through the space between the peripheral wall of the combustion chamber and the side wall of the outlet portion of the duct and into the exchanger inlet as an annular stream, means for supplying outside air to the burner means, bleeder duct means for continually bleeding into the atmosphere a fraction of the products of combustion being recirculated, and said bleeder duct means having its inlet connected to the recirculation duct at a level below the recirculation duct outlet portion so as to air lock a substantial portion of the heat exchanger against bleeding off of heated products when the furnace is not operating.

2. The structure according to claim 1 wherein damper means are provided at the inlet of the bleeder duct means for controlling the fraction of recirculated products which can be bled to the atmosphere by the bleeder means.

References Cited in the file of this patent

UNITED STATES PATENTS

| | | |
|---|---|---|
| 378,096 | Keane | Feb. 21, 1888 |
| 1,943,053 | Boisset | Jan. 9, 1934 |
| 2,086,812 | Luty | July 13, 1937 |